Dec. 29, 1925.

J. V. APABLASA 1,567,990

FILTERING DEVICE

Filed March 11, 1925   2 Sheets-Sheet 1

INVENTOR:
JOHN V. APABLASA.
By Atty:
Frederic M. Keeney.

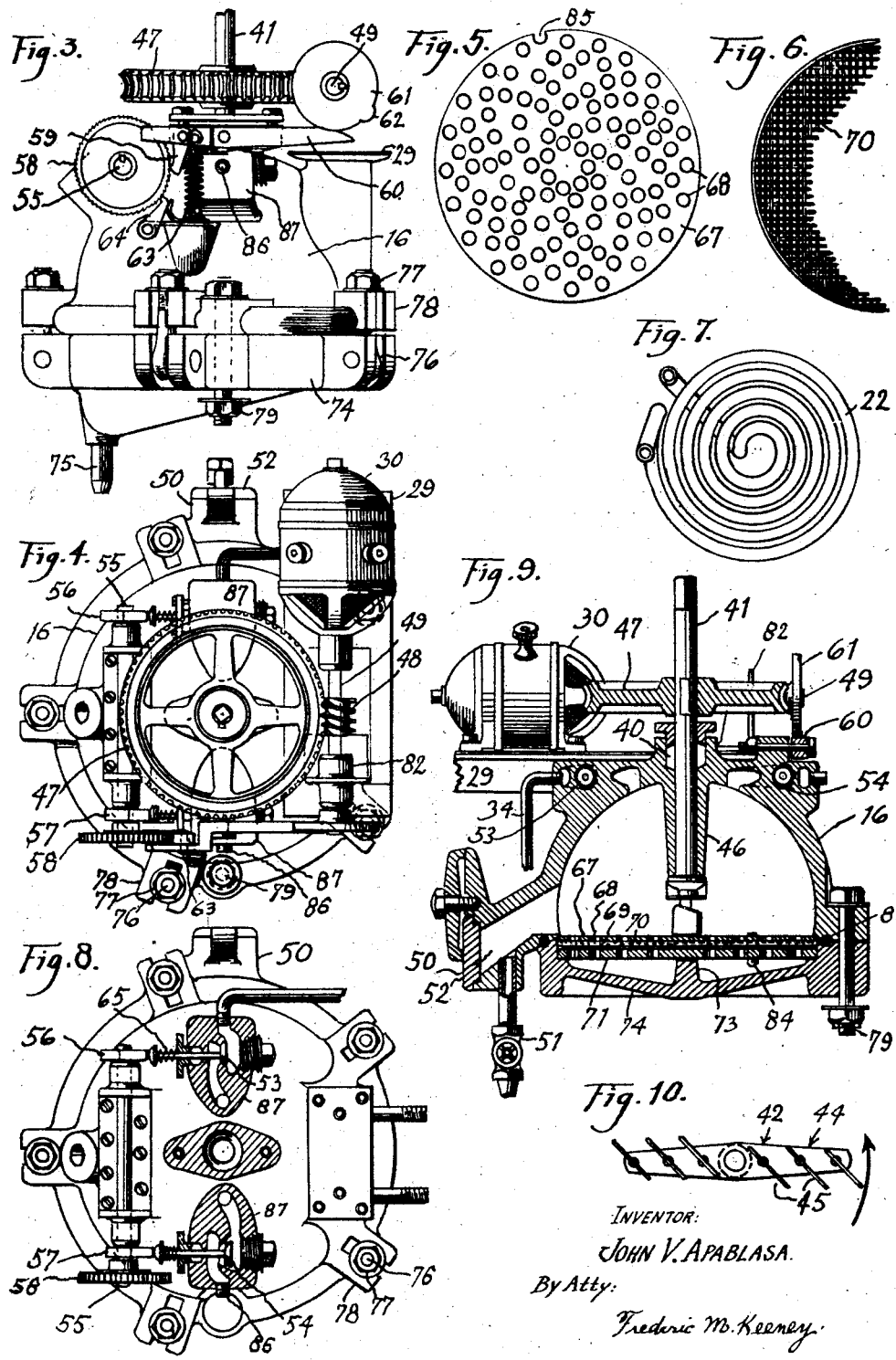

Patented Dec. 29, 1925.

1,567,990

UNITED STATES PATENT OFFICE.

JOHN V. APABLASA, OF SAN DIEGO, CALIFORNIA.

FILTERING DEVICE.

Application filed March 11, 1925. Serial No. 14,839.

*To all whom it may concern:*

Be it known that I, JOHN V. APABLASA, a citizen of the United States, residing in the city and county of San Diego and State of California, have invented a new and useful Filtering Device, of which the following is a specification.

This invention relates to filtering apparatus for reclaiming oils and fats, particularly for crank-case oils, and for other mineral, vegetable and animal oils and fats.

Lubricating oil, under use, accumulates a residue of carbon, metal dust, and dirt, grit, sand, and other foreign elements, which, under the heat of the engine, and the agitation caused by the crank and piston motion, are diffused and suspended among the oil molecules. These foreign elements may be removed by filtration, leaving the oil in its original condition of purity, and of an improved lubricating value.

My invention, therefore, has for its object to provide an improved means for preheating the oil, means for agitating the oil during the preheating step, other improved means for agitating the oil during the filtration thereof, means for agitating the oil under pressure, and means for automatically controlling the flow of oil into the filtering apparatus, whereby the filtering process may be continuous and the filtering may be done automatically.

Another object is to agitate and filter the oil with compressed air, so that all carbonized gas is removed therefrom.

Another object is to prevent clogging of the filtering elements during the filtering process.

Another object is to provide means for scraping and removing any gummy substances from the filtering elements and thereby maintain a uniform flow of the oil therethrough.

The above and other objects will become apparent in the following description which refers to the drawings, and the essential characteristics are summarized in the claims.

Figure 1:
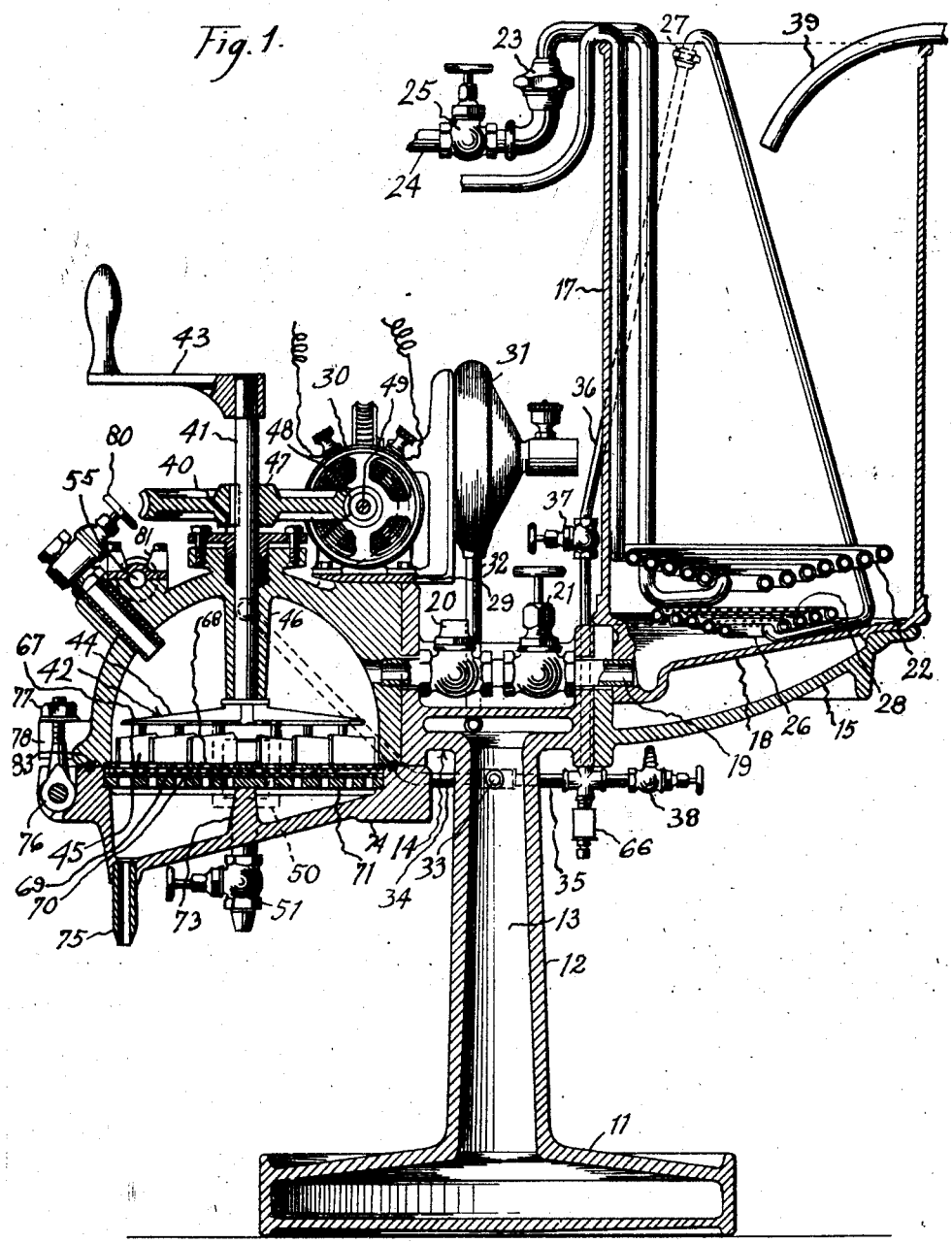
Figure 2:
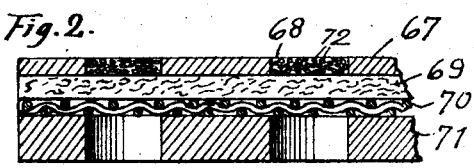

Upon the annexed drawings, Figure 1 is a sectional elevation showing a practical embodiment of my improved filtering apparatus. Fig. 2 is a fragmentary and detail sectional view of the filtering elements, drawn on an enlarged scale. Fig. 3 is a side elevation of the filter container detached from the standard. Fig. 4 is a top plan view of the filter container showing the electric motor mounted thereon. Fig. 5 is a plan and detail view of a metal filtering plate. Fig. 6 is a fragmentary and detail plan view of the filtering screen. Fig. 7 is a plan and detail view of the steam heating coil. Fig. 8 is a plan and sectional view of the filter container taken through the plane of the air controlling valves. Fig. 9 is a longitudinal and sectional view of the filter container. Fig. 10 is a bottom plan view of the plow or agitator; the arrow showing the direction of rotation.

Assuming the invention to be embodied as illustrated, the base 11 and standard 12, are integral, and are arranged to form an air chamber 13. The upper part of the standard is provided with a head 14, on one end of which is secured a bracket 15, and on the opposite end, the filter container 16.

A preheating tank 17 is mounted on bracket 15, and its bottom portion 18, is connected by a pipe 19, with the filter container 16. The pipe 19 includes a check-valve 20 and a hand valve 21, for controlling the flow of the liquid or oil to be filtered.

The preheating tank 17, has mounted therein a coil 22, of steam pipe. The steam coil is connected by a union fitting 23, with pipe 24 leading to a source of steam (not shown); the pipe having mounted therein a control valve 25, for admitting steam to the coil. Beneath the steam coil 22, I provide a coil 26, of pipe for admitting air to the tank 17, for means for agitating the contents of the tank during the heating step. The air pipe 26 is provided with a union fitting 27, to permit the removal of the air pipe coil from the tank 17. The union fitting 23, permits the detachment and removal of the steam coil in a similar manner. The air pipe coil is provided with a series of minute apertures 28, through which the air pressure is admitted for agitating the contents of the tank.

A bracket support 29 is mounted on the filter container 16, and has mounted thereon the electric motor 30, and an air compressor 31, arranged to be operated by the electric motor. Through the pipe 32, the air compressed by the air compressor, is transmitted to the chamber 13, in standard 12. Through pipes 33 and 34, the air pressure is conveyed to the top of the filter container, and through pipes 35 and 36, is conveyed to the agitating coil 26. A valve 37 controls the flow of the air pressure to the coil 26. I further provide a valve 38 in communication with the air pipe, and to which an air hose (not shown) may be connected for cleaning the heating tank. The pipe 39, leads to a source of the oil or substance to be treated (not shown), and admits the same to the heating tank.

The oil or material to be treated, after being heated, is conveyed to the filter container 16, which is clamped to the opposite end of the standard head 14. The filter container is provided with a stuffing-box 40, in which is mounted the rotary shaft 41, having on its lower extremity, an agitator 42, and on its upper extremity, a detachable hand crank 43, adapted for manual operation of the agitating elements within the container. The agitator 42 consists of a body portion 44, and a series of plows 45 mounted thereon, and inclined at an angle so that, as the agitator is rotated, the foreign ingredients and non-filterable gummy substances will be thrown outwardly and off from the filtering elements. The axial core 46 serves to hold the agitator in contact with the filtering elements. A worm-wheel gear 47, mounted on shaft 41, is adapted to be driven by a worm pinion 48, on electric motor shaft 49. For collecting the non-filterable substances and foreign ingredients, I provide a side chamber 50, in which the same may accumulate. At intervals, and when there is a pressure within the filter container, the valve 51 may be opened, and the accumulated material will be blown out of the side chamber. At other times, the cover 52 may be removed for this purpose.

A certain pressure within the filter chamber is desirable. I therefore provide, at the top of the filter chamber, an air inlet valve 53, and an air exhaust valve 54. The pressure must be intermittently released, to allow a new supply of the oil or fluid from the heating tank to be admitted into the filter container, for the oil flows by gravity from the heating tank, and will only pass through the check-valve 20, when the pressure in the container is normal.

To operate the air valves 53 and 54 alternately and intermittently, I provide a cam shaft 55, having mounted thereon the cams 56 and 57, arranged so that, as one cam is holding a valve in open position, the remaining cam is inactive. The cam shaft 55 has mounted thereon a ratchet wheel 58, which is operated by a spring-actuated pawl 59, pivotally mounted upon rock-arm 60, and at one extremity thereof. A cam-wheel 61, mounted on the motor shaft 49, and provided with a cam 62, actuates the rock-lever 60, during each revolution, and the arrangement is such that the ratchet wheel 58 is advanced in rotation the amount of one tooth, and is rotated at one revolution per minute. A coil spring 63 retracts the rock-lever 60, and a spring-actuated pawl 64, prevents a contrary rotation of the ratchet wheel. Springs 65, serve to return the valves 53 and 54 to closed position when the valve cams 56 and 57 are inactive. A pressure release valve 66, is connected to the delivery pipe line, and serves as a safety valve to control the pressure within desirable limits. The agitator within the container, is revolved at a speed of twenty revolutions per minute.

The filtering elements consist of a top plate 67, provided with perforations 68, a felt fabric 69 beneath the top plate, a wire screen 70, of coarse mesh, beneath the felt fabric, a bottom metal plate 71, having perforations corresponding to those of the top plate, and filtering sand 72, disposed in the perforations in the top plate. The bottom plate 71 is supported centrally by an abutment 73 projecting upwardly from the cover 74.

The cover is provided with an open-ended discharge tube 75, and is clamped to the bottom of the filter container by means of stud-bolts 76, hingedly connected to the cover, and provided with clamp-nuts 77, adapted to engage with the abutments 78, projecting from the filter container. When the cover is released, it drops down upon the supporting bolt 79, and may be swung outwardly from beneath the filter container. To place the filtering sand in position in the apertures in the top filtering plate, I provide a valve 80, through which the sand is admitted.

The cam shaft 55 is journalled in a bracket member 81, and the motor shaft is journalled in a bracket member 82. A gasket element 83, prevents leakage between the filter container and cover.

To maintain the top and bottom filtering plates in alignment so that the holes therein will register one with the other, I provide a lug 84, fixed to the cover, and provide the plates with a corresponding notch 85 to engage with the lug.

It may be noted that the body portion of the filter container is provided with the abutments 87, containing air inlet and release valves 53 and 54. The released air pressure exhausts through the opening 86.

In the filtering of various oils and fats, it has been found advantageous to add clay in varying quantities in accordance with the nature of the substance to be treated. This has a tendency to form a deposit upon the top of the filtering elements. This has a tendency to quickly wear out paper or cloth fabric filtering elements. To overcome this defect, I provide a top and bottom metal plate, each plate perforated, and place the paper or fabric elements therebetween. Gummy substances will quickly clog the paper or cloth filtering elements and, therefore, I provide a filtering sand which fills the apertures in the upper metal plate. The filtering elements are centrally supported and therefore cannot collapse or bend under the combined heat and pressure within the filter chamber. The wire screen filtering element serves to prevent the paper or cloth filtering elements from being forced through the holes in the bottom metal plate, by the pressure within the filter chamber. The pressure within the filter chamber is automatically admitted and released, thus allowing the filter chamber to empty and to refill without attention on the part of the operator. The oil passes through the filtering elements more expeditiously when there is a pressure within the filter chamber, and the oil enters the filter chamber only when the pressure within the filter chamber is normal or atmospheric pressure. I therefore provide the inlet and discharge valves for air pressure, and means for opening and closing them alternately.

From the foregoing description and drawings, it may be seen that I have provided a simple and efficient apparatus for filtering and reclaiming crank-case lubricating oils, and for analogous substances.

What is claimed is:

1. In a filtering device, the combination with a filter container, of a cover detachably secured to the bottom of the container, rigid and perforated top and bottom filter plates supported by the cover, other filtering elements interposed between the top and bottom plates, means for maintaining the alignment of the plates whereby the perforations of the top plate will register with the perforations of the bottom plate, a filtering sand disposed in the perforations of the top plate, an agitator within the container serving to clean the top plate, and means for rotatively operating the agitator.

2. In a filtering device, the combination with a filter container, of a cover detachably secured to the bottom of the filter container, rigid and perforated top and bottom filtering plates supported by the cover, other filtering elements interposed between the top and bottom plates, a lug projecting from the cover, and notched portions in both top and bottom plates to engage with the lug whereby the perforations in the top plate will register with the perforations in the bottom plate.

3. In a filtering device, the combination with a filter container including a side chamber, of a cover secured to the bottom of the container, filtering elements within the container and supported by the cover, a revoluble agitator within the container and above the filtering elements, means for actuating the agitator, and inclined plow elements forming the bottom portion of the agitator and arranged to force the sediment from the filtering elements and outwardly into the side chamber.

4. In a filtering device, the combination with a filter container including a side chamber, of a cover secured to the bottom of the container, filtering elements within the container including a top plate, an abutment centrally located on the cover and serving to support the filtering elements, a revoluble agitator within the container and above the filtering elements, a core extending to support the agitator against the top plate filtering element, and deflecting plows forming the bottom of the agitator and inclined to force the sediment outwardly and into the side chamber.

5. In a filtering device, the combination with a filter container including a side chamber, of a cover secured to the container filtering elements supported by the cover, a revoluble agitator including plow elements within the container and above the filtering elements, said plows being inclined to force the sediment outwardly and into the side chamber, and a valve at the bottom of the side chamber.

6. In a filtering device, the combination with a filter container including a side chamber, of filtering elements within the container, a revoluble agitator above the filtering elements, plow elements on the agitator inclined to force the sediment from the filtering elements and outwardly into the side chamber, and a cover detachably secured to the side chamber.

7. In a filtering device, the combination with a filter container including abutments projecting therefrom, of filtering and agitating elements within the container, means for admitting the oil to be filtered into the container, including a heating tank, a transmission pipe between the tank and container, a check-valve and a hand valve mounted in the transmission pipe, means for generating an air pressure adjacent to the container, a pressure inlet valve mounted in one abutment, a pressure release valve mounted in the opposite abutment, a pipe conveying the pressure from the generating means to the inlet valve, and means for opening said inlet and release valves intermittently and alternately to form an intermittent pressure within the container.

8. In a filtering device, the combination with a filter container, of filtering and agitating elements within the container, means for admitting oil into the filter container including a pipe and a check-valve therein, pressure inlet and discharge valves mounted in the walls of the container, and in communication with the filter chamber above the filtering elements, a source of air pressure adjacent to the filter container, an air pipe leading from the pressure source to the inlet valve, and means for opening and closing said inlet and discharge valves alternately to produce an intermittent air pressure within the filter chamber.

9. In a filtering device, a tank for preheating the material to be filtered, heating means disposed within the heating tank, means for agitating the contents of the heating tank with air pressure, including a perforated coil of air pipe disposed beneath the heating means, a container spaced apart from the heating tank, filtering elements in the container, means of communication between the container and heating tank, a check-valve in the communicating means to prevent return of material to the heating tank, means for admitting air pressure to the container to force the material through the filtering elements, means for releasing the air pressure in the container to permit the material to enter through the check-valve into the container, and means for actuating the pressure inlet and release valves alternately to produce the intermittent pressure in the container.

10. In a filtering device, a tank for preheating the oil to be filtered, steam heating elements within the tank, means for forcing jets of air into the oil beneath the steam heating elements, a container spaced apart from the heating tank, filtering elements within the container, a pipe affording communication between the heating tank and container, a check-valve in said communicating pipe, a source of air pressure, a pipe leading from the source of air pressure to the top of the container and above the filtering elements, an inlet valve to control the entrance of the air pressure, a discharge valve to release the air pressure, a cam shaft mounted on the container, cams on the cam shaft and in opposed relation and arranged to actuate the pressure and release valves, a ratchet wheel on the cam shaft, a ratchet mechanism to actuate the ratchet wheel, electro-mechanical mechanism to actuate the ratchet mechanism, agitating elements within the container and above the filtering elements, and means for actuating the agitator.

11. In a filtering device, a container, filtering elements therein, a cover for the bottom of the filter chamber, a lug projecting from the bottom of the cover to support the filtering elements against a pressure, means for introducing the material to be filtered into the top of the container, means for introducing an air pressure into the filter chamber above the material to be filtered, means for releasing the pressure from the filter chamber, and electro-mechanical elements arranged to alternately actuate the pressure inlet and releasing means.

In testimony whereof I hereunto affix my signature.

JOHN V. APABLASA.